United States Patent

[11] 3,609,405

[72] Inventors Jon M. Surprise
Mogadore;
Charles D. Blust, Stow, both of Ohio
[21] Appl. No. 795,799
[22] Filed Feb. 3, 1969
[45] Patented Sept. 28, 1971
[73] Assignee Goodyear Aerospace Corporation
Akron, Ohio

[54] SHARP RISE-AND-FALL TIME, HIGH-AMPLITUDE PULSE GENERATOR
6 Claims, 11 Drawing Figs.

[52] U.S. Cl. .......... 307/263, 307/246, 307/254, 307/268, 330/30 D
[51] Int. Cl. .......... H03k 5/12
[50] Field of Search .......... 307/246, 254, 255, 260, 262, 263, 268, 270, 215; 330/30 D

[56] References Cited

UNITED STATES PATENTS

| | | | |
|---|---|---|---|
| 3,077,566 | 2/1963 | Vosteen | 330/30 D X |
| 3,292,098 | 12/1966 | Bensing | 330/30 D X |
| 3,396,282 | 8/1968 | Sheng et al. | 307/215 X |
| 3,416,003 | 12/1968 | Walker | 307/207 |
| 3,435,359 | 3/1969 | Sennhenn | 330/30 D X |
| 3,065,358 | 11/1962 | Lee et al. | 307/270 X |
| 3,174,054 | 3/1965 | Wortzman | 307/254 X |
| 3,192,401 | 6/1965 | Gray | 307/260 |
| 3,244,910 | 4/1966 | Leifer | 307/254 |
| 3,469,111 | 9/1969 | Peters et al. | 307/246 X |

OTHER REFERENCES

PUB I " Low Impedance Switch Circuit" by Gillett in IBM Technical Disclosure Bulletin, Vol. 7, No. 6, November 1964 Page 440

*Primary Examiner*—Stanley D. Miller, Jr.
*Attorneys*—J. G. Pere and L. A. Germain

ABSTRACT: A pulse circuit switches in response to a bipolar digital logic input pulse to provide a sequential on-drive off-drive current thru low-impedance charge and discharge paths to drive an output semiconductor circuit. The output semiconductor circuit responds to the on-drive off-drive current and switches to provide a low-impedance charge path for a high-amplitude, high-speed output current pulse.

INVENTORS
CHARLES D. BLUST
JON M. SURPRISE
BY:
L.A. Germain
AGENT

INVENTORS
CHARLES D. BLUST
JON M. SURPRISE
BY:
L.A. Germain
AGENT

SHARP RISE-AND-FALL TIME, HIGH-AMPLITUDE PULSE GENERATOR

This invention relates generally to switching circuits and signal generators and more specifically to a pulse-generating circuit employing semiconductor devices.

It is general object of this invention to provide an electronic switching circuit which generates high-current amplitude pulses with maximum speed, efficiency, low power dissipation, and a minimum number of components.

Another object of this invention is to provide output pulses having a sharp rise-and-fall time and very short pulse width.

Still another object is to provide a high-speed electronic switching circuit having a bipolar drive scheme which provides both on-drive and off-drive current such that the maximum available current is used to drive the output in both drive-on and drive-off modes of operation.

Another object of this invention is to provide a high-speed switching circuit which lends itself to integrated circuit techniques resulting in miniaturization of the circuit. These objects and other objects and advantages of the invention will become apparent from the following description and accompanying drawings of the preferred embodiments of the invention.

Figure 1:
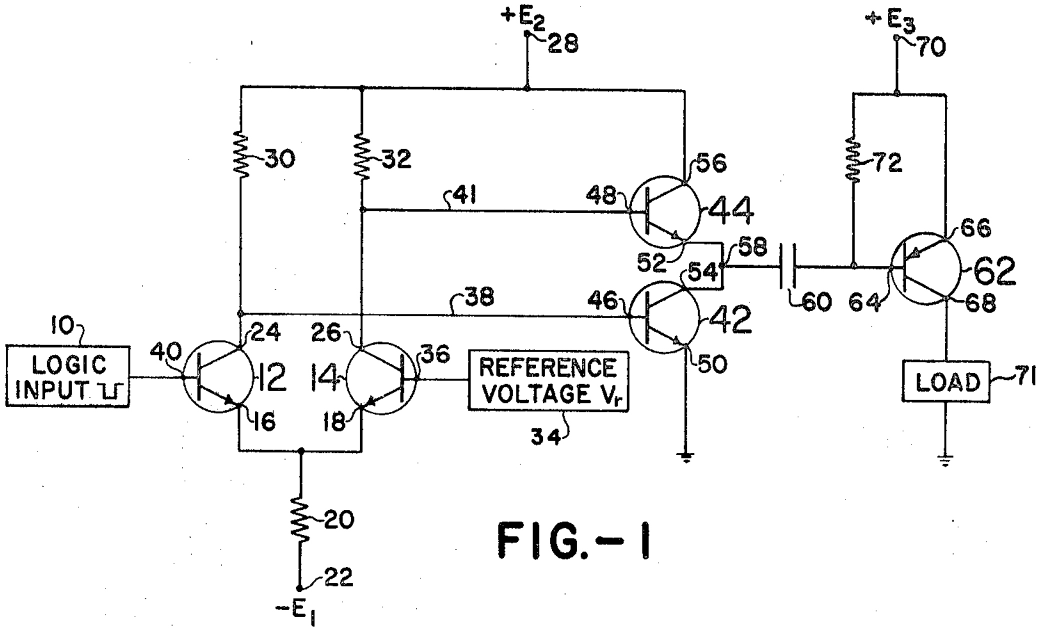
Fig. 1 is a schematic circuit diagram of one embodiment of the invention.

With reference to the form of the invention shown in FIG. 1, a circuit is provided including a first pair of NPN-type transistors 12 and 14 having respective base, emitter, and collector electrodes. The emitters 16 and 18 are commonly connected through a resistor 20 to a source of negative DC potential $E_1$ at 22. The potential source $E_1$ and resistor 20 combine to form a substantially constant current source. The collectors 24 and 26 of transistors 12 and 14 respectively, are connected through their respective resistances 30 and 32 to a source of positive DC potential $E_2$ at 28. The base 36 of transistor 14 is connected to a source of constant level DC voltage 34 which will hereinafter be referred to as a reference voltage $V_r$. The base 40 of transistor 12 is connected to a source of digital logic-input pulses 10. The logic-input pulses are readily available in most digital equipments and are within the knowledge of persons skilled in the art. The circuit herebefore described including transistors 12 and 14, is also a well-known high-speed digital circuit described and claimed in U.S. Pat. No. 2,964,652 to H. S. Yourke as a "current switch." The outputs of the current switch are taken off the collectors 24 and 26 via conductors 38 and 41 respectively.

Connected to the outputs of the current switch are a second pair of NPN-type transistors 42 and 44 having respective base, emitter and collector electrodes. The base 46 of transistor 42 is connected via conductor 38 to the collector 24 of transistor 12, and the base 48 of transistor 44 is connected via conductor 41 to the collector 26 of transistor 14. Transistor 44 has its collector 56 connected to the source of positive DC potential $E_2$ at 28, while transistor 42 has its collector 54 connected to the emitter 52 of transistor 44. The emitter 50 of transistor 42 is ground connected. The output of this circuit is taken at 58 to which is connected, through a coupling element 60, an output semiconductor 62. The semiconductor 62 is a PNP-type transistor having its base 64 connected to the output side of the coupling element 60 and to the potential $E_3$ at 70 through the base bias resistor 72. The emitter 66 is connected to potential $E_3$ and the collector 68 is connected to ground potential through load 71. The coupling element 60 is shown and described in this embodiment as a capacitor, however, other components such as zener diodes will work as well and all within the knowledge of persons skilled in the art.

In operation, the circuit of FIG. 1 accepts a logic input having a voltage level normally more positive than the level of the voltage reference $V_r$. Transistor 12 of the current switch is normally conductive and its collector is at substantially ground potential. Transistor 42, by virtue of its base being at the same potential as collector 24 of transistor 12, is OFF or nonconducting. Transistor 14 of the current switch has its base-emitter junction reverse biased and is normally OFF, and its collector 26 is at substantially the potential of DC source $E_2$. Transistor 44, having its base at the same potential as collector 26 of transistor 14, is ON and provides a low impedance charge path for the capacitive element 60. Base 64 of transistor 62 is normally at the potential of DC source $E_3$ and is normally OFF. The state of the circuit when the logic input is more positive than $V_r$ is clearly shown in the waveforms of FIG. 2A through 2F.

Figures 2A, 2B, 2C, 2D, 2E:
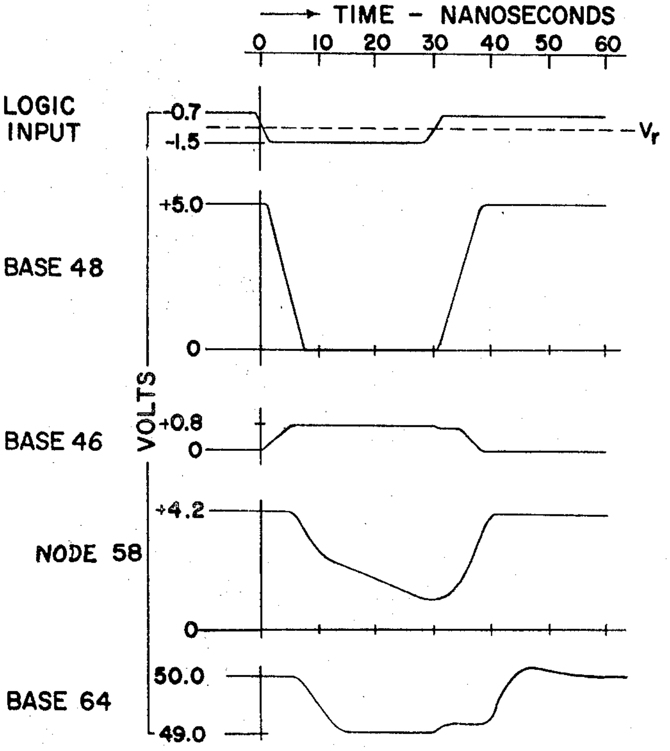
FIG. 2A through 2F are the waveforms associated with the circuit of FIG. 1.

When the logic input is a negative-going pulse which drops to a level more negative than $V_r$ as shown in FIG. 2A, transistor 12 is cut OFF and the emitter base junction of transistor 14 becomes forward biased due to the potential of source $E_1$, and transistor 14 is turned ON. The collector 26 of transistor 14 drops to substantially ground potential cutting OFF transistor 44 and the charge supply for capacitance 60. The collector 24 of transistor 12 and also the base 46 of transistor 42 have a rising potential and transistor 42 is turned ON providing a low-impedance discharge path for capacitance 60.

Figure 2F:
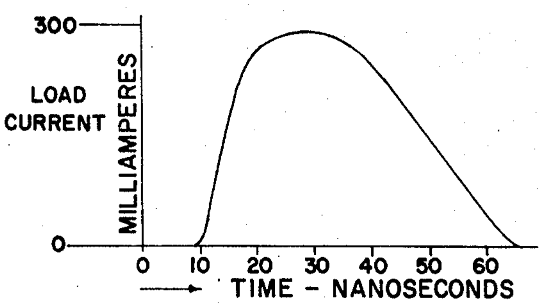

Since the discharge path for capacitance 60 is a very low impedance, the base drive to transistor 62 is high causing it to turn ON rapidly. This rapid turn ON of transistor 62 results in a step output having a rise time on the order of 10 nanoseconds as shown in FIG. 2F.

At the end of the logic-input pulse, transistor 12 is turned ON with the resulting cut OFF of transistor 42 and the discharge path for capacitance 60. Transistor 14 is cut OFF with the resulting turning ON of transistor 44 and subsequent recharging of capacitance 60. Transistor 62 is cut OFF resulting in an output pulse to the load 71 having very fast rise and fall times, and a pulse width in the nanosecond range.

The circuit of FIG. 1 having the component values listed below, and connected to a 150-ohm load, provided an output pulse having a rise time of 10 nanoseconds, a pulse width of 48 nanoseconds measured at the 50 percent points, and an amplitude of approximately 290 milliamperes.

| | | | |
|---|---|---|---|
| Logic Input Pulse Range | | VDC | −0.7 to −1.5 |
| $V_r$ (34) | | VDC | −1.15 |
| $E_1$ (22) | | VDC | −5.2 |
| $E_2$ (28) | | VDC | +5.0 |
| $E_3$ (70) | | VDC | +50.0 |
| Transistors (NPN TYPE) | | (12) | 2N918 |
| | | (14) | 2N918 |
| | | (42) | 2N918 |
| | | (44) | 2N918 |
| Transistor (PNP TYPE) | | (62) | 2N2905A |
| Capacitance (60) | picofarads | | 470 |
| Resistors | ohms | | (30) 550 |
| | ohms | | (32) 591 |
| | ohms | | (20) 386 |
| | ohms | | (72) 470 |

Figure 3:
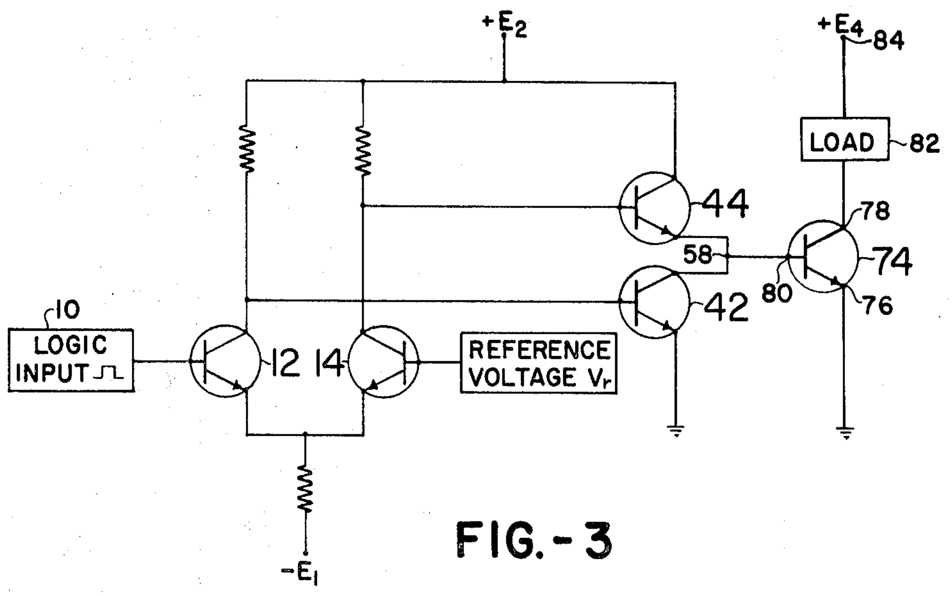
FIG. 3 is a schematic circuit diagram of another embodiment of the invention.
Figures 4A, 4B, 4C:
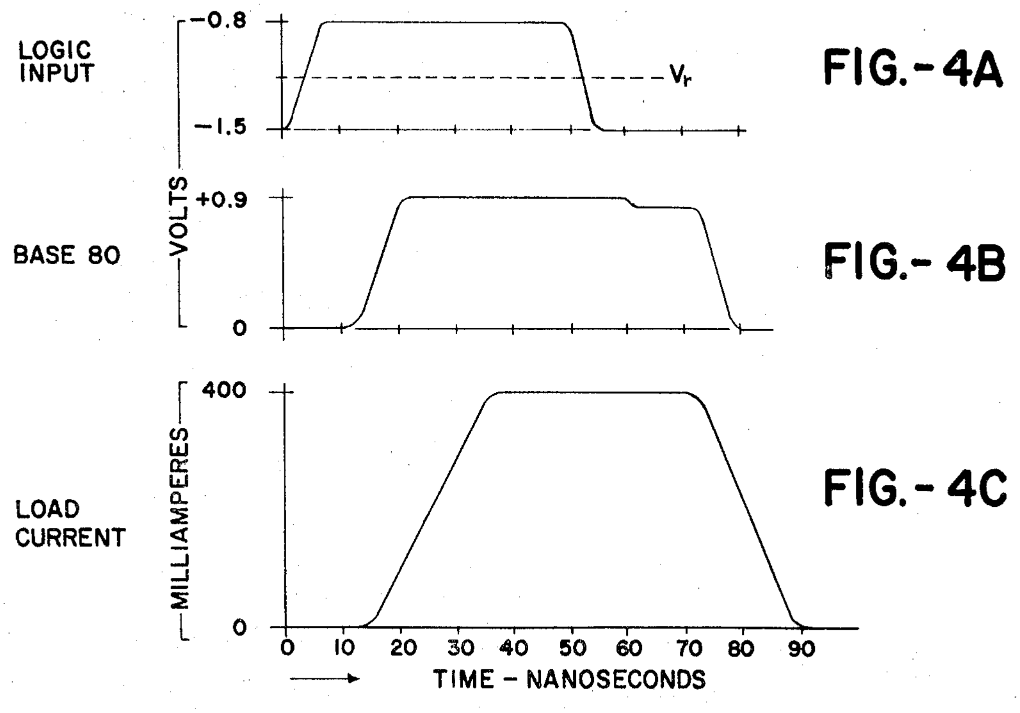
FIG. 4A through 4C are the waveforms associated with the circuit of FIG. 3.

A modified form of the circuit of FIG. 1 is shown in FIG. 3 and its associated waveforms are shown in FIGS. 4A through 4C. In through embodiment the logic input is normally more negative than $V_r$ and a positive-going logic-input pulse alternately switches transistors 12 and 14 as hereinbefore described. The capacitive element 60 and the output transistor 62 are replaced by an NPN-type transistor 74 which is direct coupled or base connected to the output at 58. The emitter 76 is ground connected and the collector 78 is connected through a load 82 to a source of positive DC potential $E_4$ at 84.

In operation, transistor 74 is driven ON or OFF by the sequential on-drive current supplied to its base 80 by the switching of transistors 42 and 44. As shown in FIG. 4C, an output pulse having a current amplitude of approximately 400 milliamperes, rise and fall times of about 10 nanoseconds, and a pulse width of 45 nanoseconds is supplied to an 80-ohm load 82 when NPN-type 2N3252 transistor, having its collector circuit biased by a positive 32 volt DC source potential $E_4$, is used in the output circuit.

Thus, it has been shown that the invention provides a switching circuit which utilizes the very low impedance paths of transistors 42 and 44 to supply the maximum available current to an output semiconductor in both drive-on and drive-off modes of operation to provide high-speed current pulses at the output, and while the invention has been particularly shown and described with reference to the preferred embodiments, it will become apparent to those skilled in the art that various outputs i.e., positive or negative going pulses, spike pulses, narrow or wide pulses, etc., may be achieved by the choice of transistors and biasing level used, and the various logic inputs available. It will also become apparent to one skilled in the art that circuits herein described are readily adapted to integrated circuit techniques and may be so fabricated for low power dissipation and miniaturization of the circuit without deviating from the spirit of the invention.

What is claimed is:

1. A pulse-switching circuit comprising:

a. a reference voltage source;

b. a source of logic pulses bipolar with respect to the reference voltage source;

c. bias voltage means;

d. first pair semiconductor means having base, emitter, and collector electrodes, one of the pair base connected to the source of logic pulses, the other of the pair base connected to the reference voltage source, the collectors of the pair connected to the bias voltage means, and the pair interconnected at their emitters and to the bias voltage means wherein a current is effected to flow in one of the pair when the logic pulse is positive with respect to the reference voltage, and in the other of the pair when the logic pulse is negative with respect to the reference voltage;

e. second pair semiconductor means having base, emitter, and collector electrodes, one of the pair having its collector connected to the bias voltage means and its base connected to the collector of one of the first pair semiconductor means while the other of the pair is common-emitter connected and has its base connected to the collector of the other of said first semiconductor means, said second pair semiconductor means interconnected at the remaining emitter-collector electrodes to effect an on-drive off-drive output current at said interconnection in response to the alternate and sequential current flow in the first pair semiconductor means; and f. output semiconductor means having base, emitter, and collector electrodes, said means base connected to the emitter collector interconnection of the second pair semiconductor means and responsive to the on-drive off-drive output of the second pair semiconductor means, and the collector-emitter circuit biased to provide high-speed, high-amplitude current pulses when switched into conduction.

2. The switching circuit of claim 1 wherein the output semiconductor means is an NPN-type transistor in a common-emitter configuration.

3. The switching circuit of claim 1 wherein:

a. the output semiconductor means is a PNP-type transistor; and b. a capacitor couples the base of said transistor to the emitter-collector interconnection of the second pair semiconductor means and which capacitor responds to the on-drive off-drive current of said second pair semiconductor means to drive the output semiconductor into either cutoff or conduction.

4. A switching circuit comprising in combination, four transistors of like conductivity type and an output transistor each having base, emitter, and collector electrodes, a source of collector emitter bias voltage, a source of reference voltage, a source of bipolar input pulses, means coupling the base of a first of said transistors to the source of reference voltage, means coupling the base of a second of said transistors to the source of bipolar input pulses, means coupling the collectors of said first and second transistors to the bias voltage, means intercoupling the emitters of said first and second transistors so that they operate as an emitter coupled pair wherein current flows in one of the pair when the input is positive with respect to the reference voltage and in the other of the pair when the input is negative with respect to the reference voltage, means coupling the base of a third of said transistors to the collector of said second transistor, said third transistor in a common emitter configuration, means coupling the base of the fourth of said transistors to the collector of said first transistor, means coupling the collector of said fourth transistor to the bias voltage, means coupling the base of said output transistor to the collector of said third transistor and to the emitter of said fourth transistor such that said output transistor is driven into either of its conductivity states by the switching of the third and fourth transistors, said output transistor having its collector emitter circuit biased to provide high-speed, high-amplitude pulses to an output terminal.

5. The circuit of claim 1 wherein the output transistor is an NPN-type semiconductor.

6. The circuit of claim 1 wherein the output transistor is a PNP-type semiconductor and a capacitor couples its base electrode to the emitter collector intercoupled third and fourth transistors to charge and discharge in response to the third and fourth transistor switching and providing on-drive off-drive current to drive the output transistor into either of its states of conductivity.

UNITED STATES PATENT OFFICE
CERTIFICATE OF CORRECTION

Patent No. 3,609,405 Dated September 28, 1971

Inventor(s) Jon M. Surprise and Charles D. Blust

It is certified that error appears in the above-identified patent and that said Letters Patent are hereby corrected as shown below:

Column 2, line 65, after "In" change "through" to --this--.

Column 2, line 75, after "on-drive" insert --off-drive--.

Column 4, Claim 5, line 45, after "claim" change "1" to --4--.

Column 4, Claim 6, line 47, after "claim" change "1" to --4--.

Signed and sealed this 18th day of April 1972.

(SEAL)
Attest:

EDWARD M. FLETCHER, JR.
Attesting Officer

ROBERT GOTTSCHALK
Commissioner of Patents